UNITED STATES PATENT OFFICE.

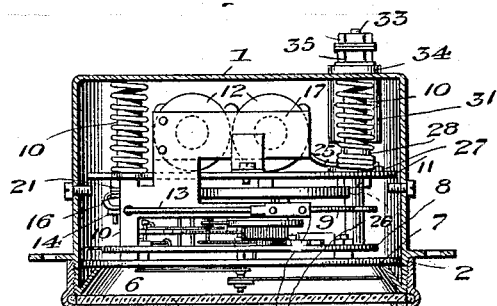

WILLIAM H. THOMPSON, OF MEMPHIS, TENNESSEE, ASSIGNOR TO THOMPSON ELECTRIC CLOCK COMPANY, OF MEMPHIS, TENNESSEE, A CORPORATION OF TENNESSEE.

ELECTRIC CLOCK.

1,150,979. Specification of Letters Patent. Patented Aug. 24, 1915.

Original application filed November 9, 1914, Serial No. 871,032. Divided and this application filed March 19, 1915. Serial No. 15,512.

*To all whom it may concern:*

Be it known that I, WILLIAM H. THOMPSON, a citizen of the United States, residing at Memphis, county of Shelby, and State of Tennessee, have invented certain new and useful Improvements in Electric Clocks, of which the following is a specification.

This invention relates to electric clocks.

The present invention is a division of my application for electric automobile clocks, filed November 9, 1914, Serial No. 871,032. While the subject-matter is particularly adapted for use as a part of an electric automobile clock constructed according to the disclosures of my said application, I do not limit myself to its use with elements, constructions and combinations of the electric automobile clock of that application, as the present improvements are susceptible of use in connection with any electric clock.

Heretofore electric clocks, of whatever type, except those which have a large case adapting them for the accommodation of batteries, have had the electric wires or conductors pass through the case or shell, from the outside, for supply of the current to the electro-magnetic movement, whether primary or secondary, for operating or controlling the clock. The manipulation of the electric cords or conductors when placing the movement in the case or shell or removing it therefrom has necessarily been a matter of much inconvenience and has taken considerable time, beside necessitating the use of exposed holes where the wires or conductors pass through the case.

In electric clocks used on automobiles, locomotives, vessels, and other vehicles, where the clock is in an exposed position or has to be disposed in a relatively small space, necessitating the use of a relatively small case, the defects of the form of wiring heretofore set forth, have been very marked; particularly when used on automobiles, the employment of exposed holes or openings through which the electric conductors pass, made the movement subject to rain and moisture interfering with its proper operation. Furthermore, the inaccessibility and difficulty of handling the movement, due to the passage of the conductors through the shell or case, has resulted in much inconvenience and loss of time when it has become necessary to remove the movement from the shell or case for repairs, cleaning or inspection.

My present invention has for its object the overcoming of the defects above mentioned and to obviate the necessity for having the electric conductors pass through openings in the shell or case and also for any manipulation of binding posts or connectors for such conductors when inserting the movement in the case or removing it therefrom.

Another object is to provide electrical connecting means which will enable the shell or case to be made entirely waterproof, facilitate removal or insertion of the movement in the shell or case, and to do away entirely with flexible connecting wires or cords for bringing the electric current to the electrically operated or controlled clock.

My invention is not limited to use in connection with any particular clock movement or electrical operating or controlling means therefor, but, to illustrate a practical embodiment of the invention, I have shown and described the invention in connection with the clock movement and electro-magnetic operating means set forth in my application, Serial No. 871,032, of which the present application is a division.

In the present invention, I provide an improved electrical connector whose parts are respectively carried by the clock case and the frame of the movement. A practical embodiment of this connector consists of an improved spring contact carried by the clock movement frame, and an improved contact on the clock case, whereby the act of inserting the clock movement in its case automatically brings the parts of the electrical contact together and, on the other hand, the entire clock movement may be bodily removed from the clock case, causing quick detachment or separation of the members of the electrical contact, without requiring the use of wires or conductor cords, detachable binding posts or fastenings, or other means or devices which necessitate manipulation.

A preferred embodiment of the invention consists of contact members carried by the case and the clock frame, one of which is a cup having an electrical contact, and the other a freely projecting metallic coil spring adapted to telescope with the cup.

In the accompanying drawings: Figure 1 is a sectional view through an electric automobile clock such as shown in my application, Serial No. 871,032, and provided with the present improvements, to illustrate how the clock movement can be inserted in, or removed from, the case, with corresponding connection or disconnection of the electrical contact; Fig. 2, a plan view looking toward the spring winding electro-magnet and showing one of the members of the improved electrical contact mounted on the clock frame and also the permanent binding post thereof, the movement being detached from the case; Fig. 3, a detail section showing the complete electrical contact when the members thereof carried by the clock frame and clock case, respectively, are engaged; Fig. 4, a detail view of the rear of the clock case, showing the binding posts for both circuit wires; and Fig. 5, a detail perspective of a portion of the clock frame and the electrical contact member carried thereby.

The following description of the clock case, removable clock frame, and operating means is given to show the use of the present electrical contact improvements and is not to be considered a limitation of the scope and application of the electrical contact means forming the subject-matter of the present improvements. The shell or case 1 is of metal and has a screw-threaded part 2 onto which removable bezel 3 screws. A spacer shell 6 may be used. The frame of the movement has a dial plate 7, front and back plates 8 and 9 connected by pillars 10, and a suitable movement carried by said plates 8 and 9. There is a supplemental back plate 11 which carries the electro-magnet 12. An armature 17 which is controlled by the electro-magnet, is subject to actuation by the electro-magnet 12 when the latter is energized and said armature in turn, winds up the spring power of the clock movement. One terminal 13 of the electro-magnet leads to a permanent binding post or connector 14 which is insulated from plate 11 and to which insulated wire 16 is connected. The wire 16 leads to a contact 21 which when the spring movement sufficiently unwinds, makes contact with the re-winding mechanism, thereby establishing an electrical circuit through the electro-magnet which then becomes energized, attracting the armature 17 and re-winding the spring power.

The foregoing construction is fully set forth in my application, Serial No. 871,032 and constitutes no part of the present invention.

The other terminal 25 of the electro-magnet 12 is connected to a binding screw 26 (Fig. 3) which is insulated by washer 27 from the plate 11 of the frame and is bodily carried thereby. A nut and washer 28 afford means for connecting the terminal 25 to the screw or post 26 which then projects freely at 29 and is snugly embraced by the contracted end of a metallic coil spring electrical contact or connector 30 so that said spring 30 is permanently carried by the screw 26, and when the entire movement is taken out of the case 1, this electrical connector 30 is carried by the clock frame and projects freely, as shown in Fig. 5. A cup 31 of insulating material is contained within the shell or case 1 and has a reduced end entering an opening 32 in the back of said shell or case. A contact screw 33 passing through the base of the cup, holds the cup in position, the head of the screw lying within the cup. The screw passes through an insulating washer 34. Suitable nuts and washers 35 secure the screw and parts together and afford means for the connection of a current supply wire. The shell 1 may have another binding post 36 for the other part of the circuit from which the current is derived.

When properly entered in the shell 1, the freely projecting contact spring 30 will enter the concavity in the cup 31 and press against the head of the screw 33, thus potentially establishing the circuit. The circuit is completed when the balance and winding disks turn, through unwinding, sufficient to establish electrical connection with the armature contact 21.

No loose connector cords pass through the shell 1, which is entirely sealed and is thus rendered waterproof. On unscrewing the bezel 3, the entire self-contained clock movement, including the electro-magnet 12, and the contact member 25, 26, 30 may be bodily removed from the shell 1, the coil spring electrical contact 30 simply pulling out of the concavity in the cup 31 as it is only in frictional contact with the head of the screw 33. The screw 33 and the cup 31 remain on the shell 1. When the clock movement is bodily reinserted in the shell or case 1 in proper position for the contact 30 to be in alinement with the socket of the cup 31, said contact 30 enters the socket and reëstablishes the electrical connection.

The present invention entirely obviates the use of electrical cords or connectors leading to the clock movement and does away with the necessity of any manipulation of cords or contacts when withdrawing the movement from its shell or inserting it therein.

I am aware that the invention is susceptible of various modifications within the spirit and scope of the invention.

Having thus described my invention, what I claim as new and desire to secure by Letters Patent, is:—

1. In an electric clock, the combination with a shell or case, of an electro-magnet ically controlled movement bodily insertible in, or removable from, said shell or case, and telescoping, self-connectible and detachable electric contact members, respectively, carried by the movement, and the shell or case, one of said contact members being a cup insulated from its support and having an electrical contact, and the other being a freely projecting metallic coil spring adapted to telescope within the cup and to engage said contact and so remain under compression when the clock movement is in the shell or case.

2. In an electric clock, the combination with a shell or case, of an electrically controlled clock movement bodily insertible in, or removable from, said shell or case, a cup constructed of insulated material carried by the shell or case, an electrical terminal connecting member insulated from and passing through the base of the cup and securing it to the shell or case, said terminal being exposed at the interior of the cup, and a freely projecting coil spring electric terminal carried by the movement and adapted for reception in the cup and for self-connection to, or self-detachment from, the terminal aforesaid.

3. In an electric clock, the combination with a shell or case, of an electrically controlled clock movement bodily insertible in, or removable from, said shell or case, a cup constructed of insulated material which has a reduced end received in an opening in the shell or case, an electrical terminal screw or bolt passing through the base of the cup and out of contact with the shell or case, the head of said screw or bolt being exposed within the cup and the threaded end being provided with a nut, a contact member connected to and insulated from the movement, said member having a groove, and a freely projecting coil spring electric terminal which has a contracted part tightly received in the groove last-named, whereby the coil spring contact is attached to the member and projects freely therefrom and is adapted to enter the cup for purposes of contacting with the head of the bolt or screw.

In testimony whereof, I hereunto affix my signature in presence of two witnesses.

WILLIAM H. THOMPSON.

Witnesses:
 W. B. HOUSTON,
 JOHN W. FARLEY.

Copies of this patent may be obtained for five cents each, by addressing the "Commissioner of Patents, Washington, D. C."